United States Patent [19]

Johansson

[11] Patent Number: 4,763,774
[45] Date of Patent: Aug. 16, 1988

[54] TRANSPORT DEVICE

[75] Inventor: Lars J. Johansson, Lerum, Sweden

[73] Assignee: AB SKF, Gothenburg, Sweden

[21] Appl. No.: 28,601

[22] Filed: Mar. 20, 1987

[30] Foreign Application Priority Data

Apr. 22, 1986 [SE] Sweden ................................ 8601843

[51] Int. Cl.$^4$ ............................................. B65G 47/31
[52] U.S. Cl. .................................... 198/461; 198/547; 198/698
[58] Field of Search ..................... 198/459, 461, 463.4, 198/698, 699, 799, 607, 611, 547, 463.5

[56] References Cited

U.S. PATENT DOCUMENTS

| 991,148 | 5/1911 | Goldman | 198/463.4 |
|---|---|---|---|
| 2,592,909 | 4/1952 | Keesling | 198/779 |
| 3,366,222 | 1/1968 | Rowekamp | 198/463.4 |
| 3,373,860 | 3/1968 | Lindgren et al. | 198/779 |
| 3,760,929 | 9/1973 | Lederer | 198/779 |
| 3,910,404 | 10/1975 | Henrekson | 198/779 |

Primary Examiner—Joseph E. Valenza
Attorney, Agent, or Firm—Eugene E. Renz, Jr.

[57] ABSTRACT

The invention refers to a transport device, which incorporates an endless belt. At the supply position for the objects to be transported, this belt has an ascending direction and is provided with mobile rollers at a certain distance above the belt and spaced apart so much that there is space only for one object between two adjacent rollers.

1 Claim, 3 Drawing Sheets

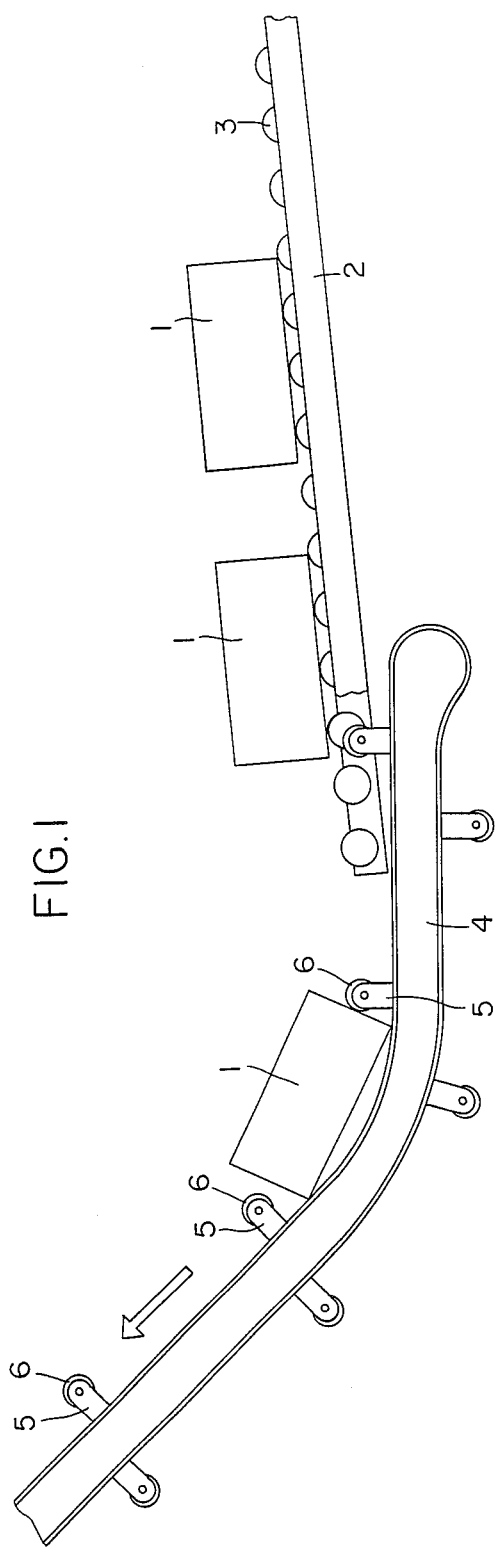

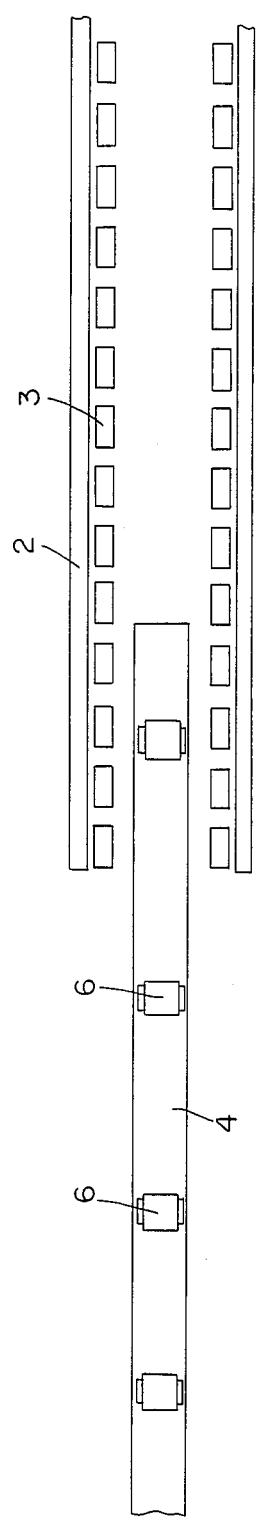

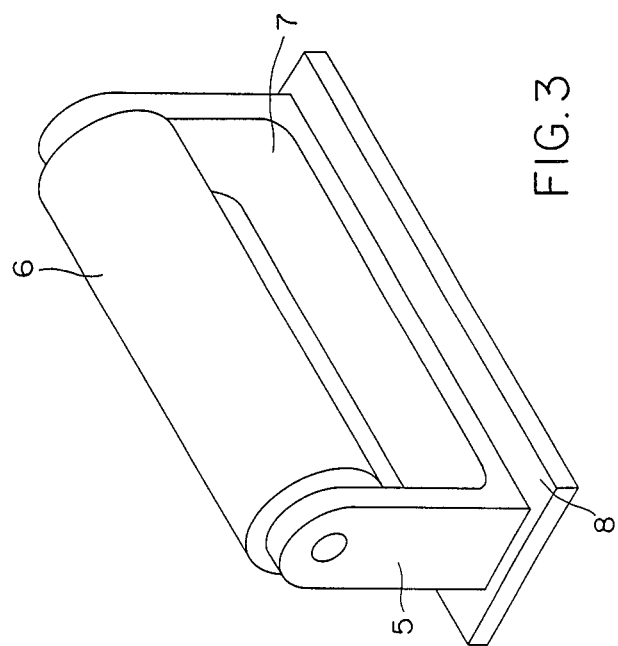

TRANSPORT DEVICE

FIELD OF THE INVENTION

The present invention refers to transport devices of the type used in industry, business and the like.

BACKGROUND OF THE INVENTION

Different transport devices for industrial use are earlier known. They commonly incorporate an endless belt which continuously or discontinuously transports objects from a working station to another or, e.g. from a store position to another. The belt may be a metallic belt or the like or can consist of separate carrying plates, which are interconnected in any proper manner and are pulled along a base. An example of such a transport device is shown in U.S. Pat. No. 3,910,404.

At such conveyors it is often important that they can convey objects upwards and that the objects arrive one-by-one in a regular order instead of laying disordered upon each other. When objects shall be transported upwards, some type of stop must generally be provided upon the belt thus that the object will not slide backwards when the belt is moved upwards. It is then important that only one object is present between each two stops and that the objects do not lay partly upon the stops. The reason for this is that the objects often shall be fed regularly sideways by aid of automatic and sophisticated devices.

This problem has been solved by the present invention and it has been provided a transport device, which incorporates an endless belt, intended to carry and convey objects intended to be displaced, and which is characterized therein, that the belt at the supply position for the objects has an ascending direction and is provided with mobile rollers at a certain distance above the belt and spaced apart so much, that there is space for only one object between two adjacent rollers.

SUMMARY OF THE INVENTION

According to the invention, it is suitable that the rollers are supported upon shafts, which extend between the shanks of U-shaped supports affixed to the belt at their web portions.

The belt can be of any type, but the invention is particularly intended for such belts, which consist of carrying plates, articulatedly connected to each other.

BRIEF DESCRIPTION OF THE DRAWINGS

These and other objects of the present invention and the various features and details of the operation and construction thereof are hereinafter more fully set forth with reference to the accompanying drawings, wherein:

FIG. 1 shows a transport device according to the invention as seen from the side thereof;

FIG. 2 shows the same transport device seen from above; and

FIG. 3 shows a support with roller fixed to a carrying plate.

DETAILED DESCRIPTION OF THE PREFERRED EMBODIMENT

In FIG. 1 is shown a row of objects 1, which roll down along a transport track 2 having mobile rollers 3. This track is somewhat sloping and the objects 1 are conveyed mainly by aid of the gravity.

The objects 1 from the track 2 fall down upon a second track 4, upon which are fixed supports 5 with rollers 6. This track 4 bends upwards after the receiving position and the objects 1 then will rest against the rollers 6, thus that they will not slide backwards. If two or more objects 1 should arrive simultaneously or almost at the same time to the track 4 and thus become placed partly over the rollers 6, then the objects, which are not positioned between two adjacent rollers 6, would slide back, thus that only one object will be positioned between two rollers 6.

FIG. 2 shows the device according to FIG. 1 seen from above. The same reference numerals refer to the same details. The objects 1 have been omitted for the sake of clarity.

FIG. 3 shows a roller 6 fixed to a support 5. This support 5 is attached with its web portion 7 to a carrying plate 8. The support can be affixed by gluing, a screw connection or the like.

The invention is not limited to the embodiment shown but can be varied in different ways within the scope of the claims.

What is claimed is:

1. A transport system for carrying and conveying objects (1) comprising a first conveyor having a support trackway inclined in a predetermined direction and consisting of a series of mobile rollers (3) arranged in spaced apart rows, a second conveyor located adjacent one end of said trackway having an endless belt with an ascending section traversing the space between said mobile rollers (3), said belt consisting of a plurality of carrying plates articulatedly connected to one another, a plurality of rotatable rollers (16) supported on shafts extending between shanks on U-shaped supports (5) attached by the web points to the conveyor belt (4), said rollers (6) arranged a predetermined distance above the belt and adjacent rollers (6) spaced apart so that there is space for only one object (1).

* * * * *